Sept. 17, 1957            J. D. BALL            2,806,295
ELECTRICAL BOREHOLE SURVEYING DEVICE
Filed Sept. 1, 1955            3 Sheets—Sheet 1
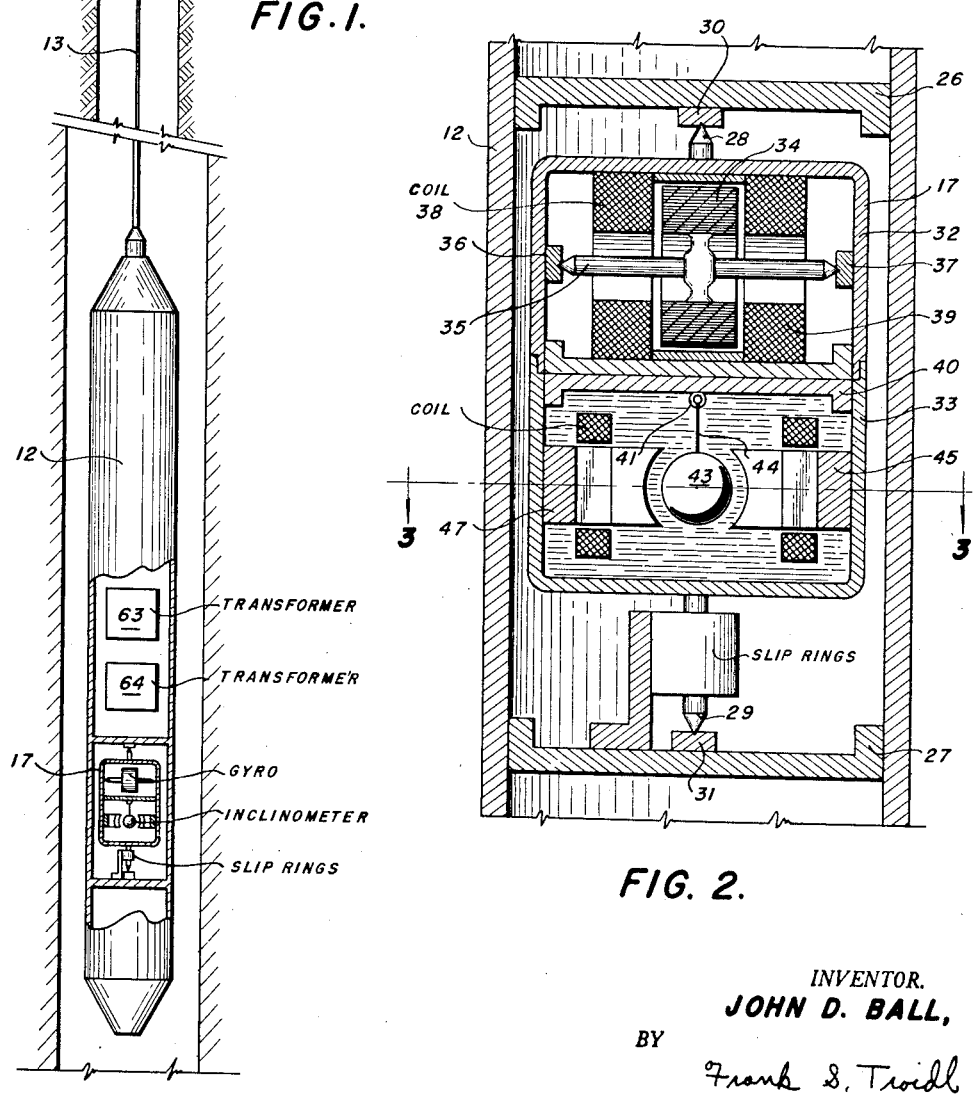
INVENTOR.
JOHN D. BALL,
BY
Frank S. Troidl
ATTORNEY.

Sept. 17, 1957  J. D. BALL  2,806,295
ELECTRICAL BOREHOLE SURVEYING DEVICE
Filed Sept. 1, 1955  3 Sheets-Sheet 2
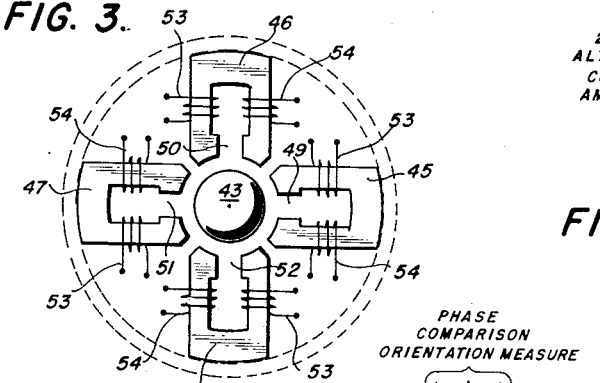
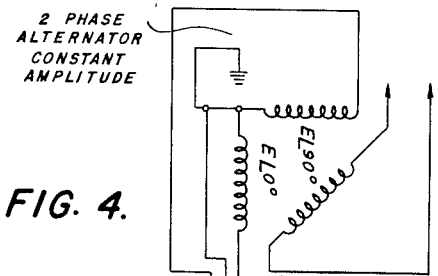
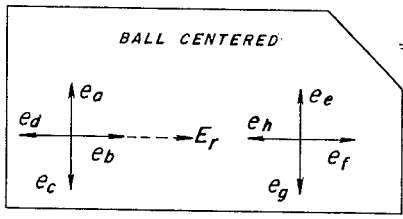
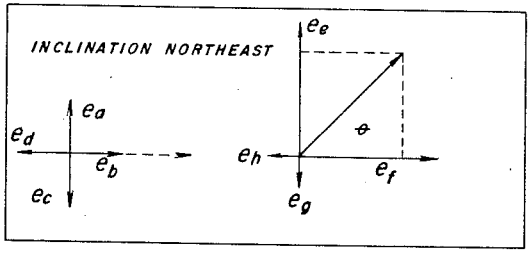
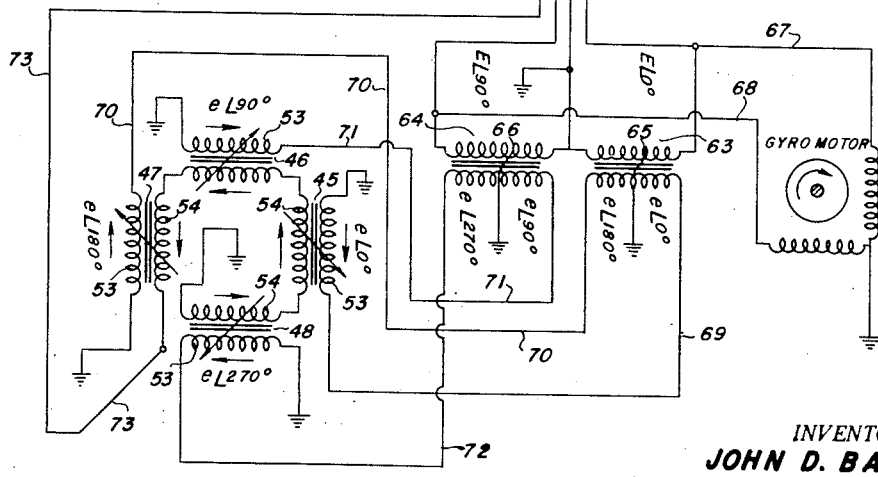
INVENTOR.
JOHN D. BALL,
BY
*Frank S. Troidl*
ATTORNEY.

Sept. 17, 1957 J. D. BALL 2,806,295
ELECTRICAL BOREHOLE SURVEYING DEVICE
Filed Sept. 1, 1955 3 Sheets-Sheet 3
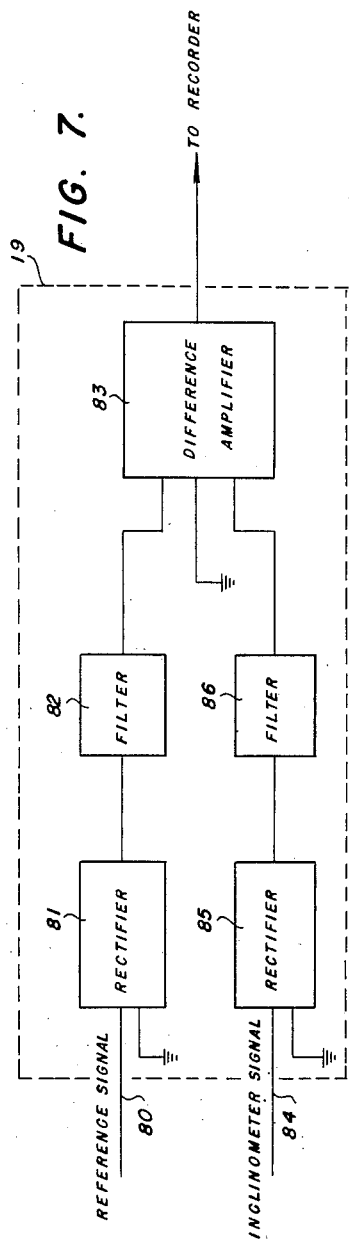
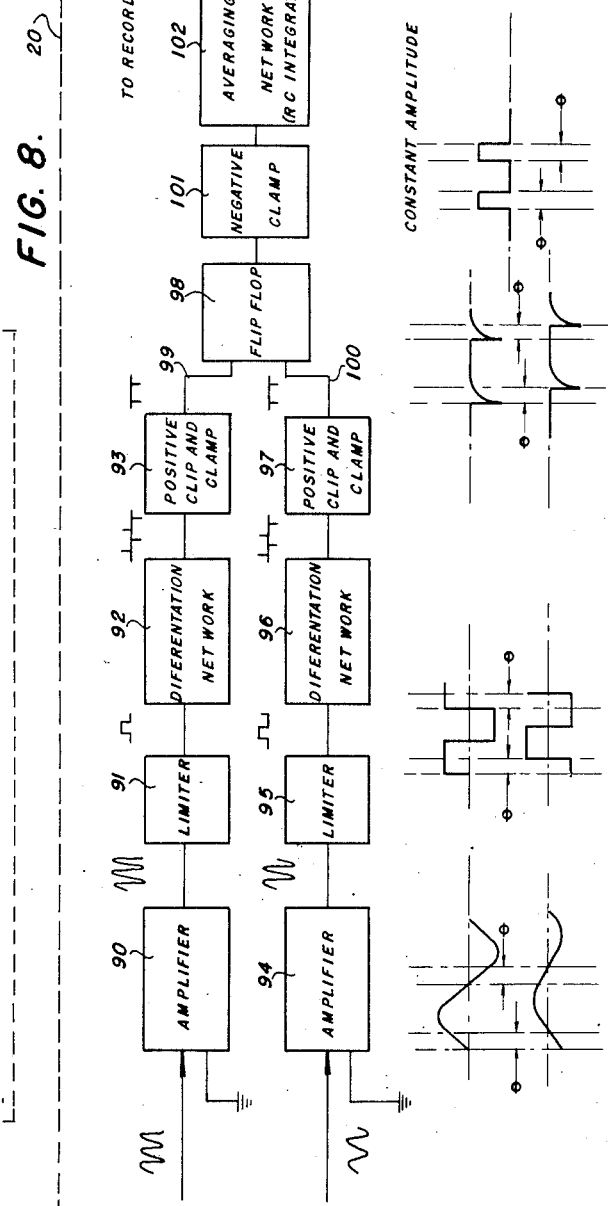
INVENTOR.
JOHN D. BALL,
BY Frank S. Troidl
ATTORNEY.

United States Patent Office 2,806,295
Patented Sept. 17, 1957

2,806,295

ELECTRICAL BOREHOLE SURVEYING DEVICE

John D. Ball, Houston, Tex., assignor, by mesne assignments, to Esso Research and Engineering Company, Elizabeth, N. J., a corporation of Delaware Application September 1, 1955, Serial No. 532,010

5 Claims. (Cl. 33—205.5)

This invention relates to a logging device for use within a borehole. More particularly, this invention relates to a surveying instrument which includes therein a means for determining the inclination and the direction of inclination of a borehole.

There are many logging devices which are known for determining the inclination and direction of inclination of a borehole. However, a great many of these devices are mechanically complicated due to a direct mechanical coupling to the measurement devices. More recently, surveying instruments have been devised which utilize electrical means for measuring the inclination and direction of inclination of a borehole with various electrical quantities being conducted to the earth's surface and the direction of inclination and degree of inclination being calculated or, by means of other electrical devices, determined. However, the determination of the proper inclination and direction of inclination is often difficult to obtain. One of the reasons for the difficulty involved in determining the proper degree of inclination and direction of inclination is the fact that the electrical quantities measured, such as a capacitance or an inductance, is in several directions in a particular plane.

It is an object, therefore, of this invention to provide a novel and useful borehole surveying instrument which does not include mechanical measuring devices and the disadvantages inherent in said mechanical measuring devices and provides for the production of a single electrical signal which contains all of the information necessary for the proper determination of the degree of inclination and the direction of inclination of a borehole.

Briefly described, my new invention consists of a housing adapted to be lowered into a borehole and an electrical network which includes therein an electrical parameter, the value of which is varied according to the direction of inclination and the amount of inclination of the housing. As a result of the variation of the electric parameter, an electric signal is conducted to the earth's surface which in amplitude is proportional to the degree of inclination and in phase, as compared to the phase of a reference signal, is proportional to and indicative of the azimuthal direction of inclination.

Other objects and a fuller understanding of the invention may be had by referring to the following description and claims taken in conjunction with the accompanying drawings in which:

Fig. 1 is a view partly diagrammatic and partly in block form showing my new well logging device and the electrical system utilized for extracting the inclination and the direction of inclination of a borehole;

Fig. 2 is a side elevational sectional view showing in detail the gyroscope and inclinometer utilized in my new well logging device;

Fig. 3 is a view taken along line 3—3 of Fig. 2;

Fig. 4 is an electrical circuit diagram of my new invention;

Fig. 5 shows a vector representation at no dip of the parameter of the electric network which varies according to the degree of inclination and direction of inclination;

Fig. 6 is a vector representation of the electric parameter of Fig. 5 when the borehole is inclined in the northeast direction;

Fig. 7 is a block diagram of the amplitude comparison system of my new borehole surveying device; and Fig. 8 is a block diagram of the phase comparison system of my new borehole surveying device.

Referring to the drawings and more particularly to Fig. 1, numeral 10 refers to the surface of the earth which has bored therein a borehole 11. Lowered into the borehole 11 is shown a well logging device having a housing 12 which is lowered into the borehole by means of a lowering means such as a cable 13 having contained therein a plurality of conductors. The cable is wound about a cable reel 14 and a depth measuring device 15. The depth measuring device 15 is mechanically coupled to the drive of a recording medium 16 as indicated by the dashed lines. The recording medium may be magnetic tape or any other suitable recording means such as is conventional in the art of well logging. By utilizing the mechanical coupling between the drive of the recording medium 16 and the depth measuring device 15, the movement of the recording medium may be correlated with the depth of the housing 12.

Located within the housing 12 is a casing 17 which contains a means for measuring the inclination of the housing 12 within the borehole 11 and a means such as a gyroscope for maintaining the casing 17 fixed regardless of the rotational movement of the housing 12. The mechanical structure of the casing 17 and the devices located within the casing 17, as well as the manner in which casing 17 is positioned within housing 12 will be subsequently described.

Located at the earth's surface is a constant voltage source 18 which may consist of a two phase alternator. Also, located at the earth's surface is an amplitude comparison system 19 and a phase comparison system 20, the operation of both of these systems being subsequently explained with reference to Figures 5 and 6. The constant voltage source 18 provides the well logging device 12 with a voltage suitable for operating the inclination indicating means and the direction of the inclination indicating means contained within housing 12 and also serves to provide both the amplitude comparison system and the phase comparison system with a reference signal, the reference signal being utilized in the process of extracting the inclination and direction of inclination of borehole 11 from a signal derived from the instruments within casing 17. Means are also provided in the electrical network for feeding the electrical signal derived which varies in amplitude according to the degree of inclination of housing 12 and varies in phase as compared to the phase of the reference signal according to the direction of inclination of the housing 12. These means may be electric conductors such as shown at 21, 22 and 23 utilized to conduct the electric signal generated out of the housing 12 to the amplitude comparison system 19 and to the phase comparison system 20. The amplitude comparison system 19 is adapted to produce an electric signal which is indicative of the amount of inclination of the housing 12 which electric signal is conducted through the conductor 24 to the recording medium 16. The phase comparison system 20 is adapted to produce an electric signal which is indicative of the direction of inclination of the housing 12 which electric signal is conducted through conductor 25 and recorded on the recording medium 16.

The mechanical structure of my new inclinometer is shown in detail in Fig. 2. Referring to Fig. 2, the casing 17 is shown mounted within the housing 12. Casing 17 is pivotally mounted to supports 26 and 27 by means of pivot points 28 and 29 which are pivotally mounted within pivot sockets 30 and 31, respectively. The casing 17 is divided into an upper section 32 and a lower section 33. The upper section 32 contains a means such as a gyroscope for maintaining some elements of the inclinometer in a fixed azimuthal direction. The lower section 33 contains therein the inclinometer. The gyroscope may consist of the conventional armature 34 which is mounted upon a shaft 35 which shaft is along the gyroscope axis of rotation. The shaft 35 is mounted in pivot mountings 36 and 37 and the gyro is kept in motion by means of field coils 38 and 39 which are electrically connected to generator 18.

Provided within the casing 17 is a weight support member 40 which has attached thereto a ring member 41 to which is attached a magnetic permeable spherical ball 43 by means of a support 44. Arranged about the magnetic permeable ball 43 are a plurality of magnets 45, 46, 47 and 48 as shown more clearly in Fig. 3. Each of the magnets 45 through 48 is connected to the inside periphery of the casing 17 in the same horizontal plane. Each of the magnets 45 through 48 has the portions which are facing toward the weight 43 shaped in such a manner as to be concentric with the surface of the ball 43 when the ball is in its central position thereby providing for better magnetic coupling of each of the magnets 45 through 48 with the high magnetic permeability material of the ball 43. To provide for a high permeability material, the ball 43 may be made of iron, or for better coupling, Mu-metal. Each of the magnets 45 through 48 is provided with a principal air gap referred to by numerals 49, 50, 51 and 52 with the azimuthal direction of the air gaps corresponding to one of the four compass points—north, south, east or west. Another gap is provided between each of the four magnets and its adjacent magnet. The purpose of this gap is to make certain that the magnetic path of least reluctance is through the principal air gaps of each magnet and the ball 43. Magnets 45 and 47 are mounted in casing 17 in the same vertical plane as the axis of the gyroscope and hence each of the magnets is kept in a fixed azimuthal direction.

Wound about each of the magnets 45 through 48 is a primary coil winding 53 and a secondary coil winding 54. The windings are placed on the magnets in such a way as to minimize the coupling due to leaking flux and electrostatic fields. The coupling that exists between the primary and secondary windings will then be principally due to the magnetic path through the principal air gap and the freely suspended weight 43.

The electrical network utilized in supplying the primary coils 53 of the magnets 45 through 48 with current is shown in Fig. 4. Referring to Fig. 4, a voltage source is utilized for supplying an electric reference signal through conductors 60 and 61 and an electric signal which is 90° out of phase with the reference signal through conductors 61 and 62. Both the reference signal and the signal which is 90° out of phase with respect to the reference signal are fed into the logging device to the transformers 63 and 64, respectively, contained within the logging device. Transformers 63 and 64 are iron core transformers with the secondary windings of said transformers being center tapped, as shown at 65 and 66, respectively. The electric signals supplied through conductors 60, 61 and 62 are also conducted by means of conductors 67 and 68 to a two phase gyromotor utilized in operating the gyroscope.

Because the secondary windings of the transformers 63 and 64 are center tapped at 65 and 66, a voltage is supplied by means of conductor 69 to the primary coil of magnet 45 which voltage is in phase with the voltage of the reference signal and a voltage is conducted to the logging device by means of conductor 70 to the primary coil of magnet 47 which voltage is 180° out of phase with the reference signal voltage. Similarly, a voltage is supplied by means of conductor 71 to the primary coil of magnet 46, the phase of said voltage being in phase with the voltage of the signal conducted to the housing 11 by means of conductor 62 which voltage is 90° out of phase with the reference signal and a voltage is supplied by means of conductor 72 to the primary coil of magnet 48 which is 180° out of phase with respect to the signal in the primary coil of magnet 46 or 270° out of phase with respect to the reference signal supplied to the primary coil of magnet 45. Hence, it can be seen that the voltage supplied to the primary coil of each magnet is 90° out of phase with the voltage supplied to the primary coils of the magnets arranged adjacent thereto with the voltage of each primary coil leading the voltage of the primary coil of one adjacent magnet by 90° and lagging the voltage of the primary coil of the other adjacent magnet by 90°.

The secondary windings 54 of each of the magnets are connected in series. Therefore, the signals in the secondary windings 54 are added to give a resultant signal which is conducted to the earth's surface by means of a single electrical conductor 73. A vector diagram of the voltages across the primary coils and the voltages across the secondary coils is shown in Fig. 5. As shown in Fig. 5, when the weight 43 is centered and, therefore, there is no inclination, the voltages $e_a$, $e_b$, $e_c$ and $e_d$, which represent the voltages across the primary coils of each of the magnets, are equal in magnitude and likewise the voltages $e_e$, $e_f$, $e_g$ and $e_h$ are equal in magnitude. Therefore, the resultant signal transmitted to the earth's surface has a zero magnitude which indicates there is no inclination. If the weight 43 is off center in any direction, such as the northeast direction shown in Fig. 6, the voltages $e_a$, $e_b$, $e_c$ and $e_d$ are the same as in Fig. 5 but the voltages $e_e$, $e_f$, $e_g$ and $e_h$ are altered according to the inclination and degree of inclination of the housing 12 in the borehole 11. As can be easily seen, the voltages $e_e$ and $e_f$ are greater than the voltages $e_g$ and $e_h$ with the resultant signal conducted to the earth's surface by means of the single electric conductor 73 being proportional in magnitude with the amount of inclination and having a phase with respect to the reference signal which is related to the direction of inclination of the housing 12 in borehole 11. The resultant signal generated through conductor 73 is conducted to the phase comparison system 20 and also to the amplitude comparison system 19.

Fig. 7 shows in block diagram an example of the component parts which might make up the amplitude comparison system 19. As shown in Fig. 7, the reference signal from the two phase constant voltage source 18 is fed through conductor 80 to a rectifier 81, a filter 82 and an amplitude difference amplifier 83. The signal from the secondary coils of the magnets 45 through 48 is fed through conductor 84 to a rectifier 85, a filter 86 and the difference amplifier 83. The difference amplifier 83 produces a signal which is proportional to the difference in amplitude of the resultant signal when compared with the reference signal. The signals from the amplitude difference amplifier 83 are fed by means of electrical conductor 87 to the recording device.

Fig. 8 shows in block diagram one type of phase comparison system 20 which may be utilized for obtaining the direction of inclination of the housing 12 within the borehole 11. The reference signal is fed to an amplifier 90, the amplifier 90 serving to amplify the alternating current of the reference signal. The amplified signal is then fed to a limiter 91 with the limiter serving to produce as an output a rectangular type wave form signal. The rectangular type wave form signal is fed to a differentiation network 92. The differentiation network 92 produces pulses which are proportional to the rate of change in magnitude of the input signal. Hence, a pulse is produced each time the magnitude of the signal received by the differentiation network changes. The pulses from differentiation network 92 are fed to a positive signal clipper 93 which is utilized to clip off the positive signals produced by differentiation network 92 and produce as an output only the negative signals.

The resultant signal conducted to the surface by means of conductor 73 is fed to an amplifier 94, a limiter 95, a differentiation network 96 and a positive pulse clipper 97. The pulses from positive pulse clipper 93 are fed to a bistable multivibrator or "flip flop" circuit 98 by means of conductor 99. The pulses from positive clipper 97 are fed to the "flip flop" circuit 98 by means of electrical conductor 100. The pulses from clipper 93 serve to turn the "flip flop" circuit on and the pulses from clipper 97 serve to turn the "flip flop" circuit 98 off thereby producing as an output from the circuit 98 rectangular waves which are constant in amplitude but which vary in width according to the phase difference between the pulses received from clipper 93 and the pulses received from clipper 97. The phase difference will be proportional to the angle θ shown in Fig. 6. The rectangular pulses from bistable multivibrator 98 are fed to a negative clamp device 101 and then to an electrical averaging network 102 which is an RC integrator. Averaging network 102 produces a signal which is proportional to the area of the rectangular pulses received as an input with the area of the rectangular pulses being proportional to the angle θ. The output of averaging network 102 is conducted to the recording medium.

In operation, therefore, my new borehole surveying device is lowered into a borehole and as the housing 12 is lowered into the borehole it will assume the inclination from the vertical as that of the borehole. The weight 43 will remain vertical and hence the angle between the plane of the housing 12 and the weight 43 will be the angle of inclination of the borehole. The casing 17 will remain fixed as the housing 12 rotates and pivots because of the operation of the gyro mechanism contained within the casing 17. Since the axis of the gyro mechanism is along the same vertical plane as the magnets 45 and 47, the azimuthal direction of magnets 45 and 47 will remain fixed in a north and south azimuthal direction, respectively, modified, of course, by the usual gyroscopic correction for the earth's latitude on which the gyroscope is located. As the inclination and direction of inclination of the borehole varies, the resultant signal conducted through conductor 73 to the earth's surface will vary in amplitude according to the variation of inclination and in phase from the reference signal according to the direction of inclination. The resultant signal is fed to the amplitude comparison system and the phase comparison system with the amplitude comparison system producing a signal which is proportional to the amount of inclination of the borehole and the phase comparison system producing a signal which in area is proportional to the azimuthal angle of the direction of inclination from the azimuthal direction of magnet 45. The inclination and direction of inclination are directly recorded on recording medium 16.

Hence it can be seen that I have devised a new borehole surveying instrument which does not require the direct measurement of an electrical quantity in a plurality of different planes and which provides in a single electrical signal all of the information as to inclination and direction of inclination of a borehole.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What I wish to claim as new and useful is:

1. A borehole surveying device including: a housing adapted to be lowered into said borehole; a pendulous weight of magnetic material freely suspended within said housing; four magnets separated 90° in direction from each other arranged about said weight; a primary coil and a secondary coil wound about each of said magnets, said secondary coils being connected in series; an electrical network including means for supplying the primary coil of one of said magnets with a reference signal and means for supplying the primary coil of each of the other of said magnets with a signal which is 90° out of phase with the voltage supplied to the primary coils of the magnets arranged adjacent thereto with the voltage of each primary coil leading the voltage of the primary coil of one adjacent magnet by 90° and lagging the voltage of the primary coil of the other adjacent magnet by 90°; and means for conducting the resultant signal from all of the secondary coils of said magnets to the surface of the earth, the resultant signal being in amplitude proportional to the inclination of said housing.

2. A borehole device including: a housing adapted to be lowered into a borehole, an orientation and inclination instrument casing mounted within said housing so as to permit said housing to rotate and pivot about said casing; a pendulous weight of magnetic material freely suspended in said casing; four magnets separated 90° in direction from each other arranged about said weight; a primary coil and a secondary coil wound about each of said magnets, said secondary coils being connected in series; an electrical network including means for supplying the primary coil of one of said magnets with a reference signal and means for supplying the primary coil of each of the other of said magnets with a signal which is 90° out of phase with the voltage supplied to the primary coils of the magnets arranged adjacent thereto with the voltage of each primary coil leading the voltage of the primary coil of one adjacent magnet by 90° and lagging the voltage of the primary coil of the other adjacent magnet by 90°; a gyroscope also mounted within said casing, said gyroscope serving to maintain said casing fixed as said housing rotates thereby keeping each of said magnets facing in a fixed azimuthal direction; means for conducting the resultant signal from all of the secondary coils of said magnets to the surface of the earth, the resultant signal being in amplitude proportional to the inclination of said housing and having a phase difference with respect to said reference signal indicative of the direction of inclination of said housing; means for extracting the degree of inclination of said housing from said resultant signal; and means for extracting the direction of inclination of said housing from said resultant signal.

3. A borehole device in accordance with claim 2 wherein said means for extracting the degree of inclination of said housing from said resultant signal includes an amplitude difference amplifier in said electric network with electrical means being provided for feeding both said reference signal and said resultant signal to said amplitude difference amplifier, the output of said amplitude difference amplifier being proportional to the degree of inclination of said housing and wherein said means for extracting the direction of inclination of said housing from said resultant signal includes an electrical phase comparison system with electrical means being provided for feeding both said reference signal and said resultant signal to said electrical phase comparison system, said electrical phase comparison system being adapted to produce, as an output, rectangular waves each having the same amplitude and having a time duration proportional to the direction of inclination of said housing.

4. A borehole surveying device including: a housing adapted to be lowered into said borehole; first means mounted within said housing adapted to produce an electric signal representative of both the degree of inclination and the direction of inclination of said housing, said electric signal being conducted to the surface of the earth by an electric conductor, said first means including a freely suspended weight made of magnetic material; and a plurality of magnets arranged about said weight, each of said magnets having wound thereon a primary electric coil and a secondary electric coil, with the secondary electric coils being connected in series to form part of said electric conductor; means for supplying each of the primar coils of said magnets with a voltage which is out of phase with the voltage supplied to each of the primary coils of the other magnets, the position of said weight resulting in a signal being conducted by said conductor which in magnitude is proportional to the degree of inclination of said housing and the phase of which with respect to the phase of the voltage supplied to one of said primary coils is proportional to the direction of inclination of said housing; first circuit means connected to said conductor for producing an electric signal representative of the magnitude of said signal conducted by said conductor; second circuit means connected to said conductor for producing an electric signal representative of the phase of said signal conducted by said conductor and means for recording said signals produced by said first and second circuit means.

5. A borehole surveying device in accordance with claim 3 wherein said plurality of magnets arranged about said weight consists of four magnets arranged 90° apart in direction and wherein the voltage supplied to the primary coil of each magnet is 90° out of phase with the voltage supplied to the primary coils of the magnets arranged adjacent thereto with the voltage of each primary coil leading the voltage of the primary coil of one adjacent magnet by 90° and lagging the voltage of the primary coil of the other adjacent magnet by 90°.

References Cited in the file of this patent

UNITED STATES PATENTS

| | | |
|---|---|---|
| 1,928,969 | Kuffel | Oct. 3, 1933 |
| 1,928,971 | Dillon et al. | Oct. 3, 1933 |
| 2,317,632 | Miller | Apr. 27, 1943 |
| 2,674,049 | James | Apr. 6, 1954 |